(12) United States Patent
Shum

(10) Patent No.: US 10,697,612 B2
(45) Date of Patent: Jun. 30, 2020

(54) LIGHT DISTRIBUTION FOR PLANAR PHOTONIC COMPONENT

(71) Applicant: Frank Shum, Sunnyvale, CA (US)

(72) Inventor: Frank Shum, Sunnyvale, CA (US)

( * ) Notice: Subject to any disclaimer, the term of this patent is extended or adjusted under 35 U.S.C. 154(b) by 49 days.

(21) Appl. No.: 15/968,924

(22) Filed: May 2, 2018

(65) Prior Publication Data

US 2019/0338915 A1    Nov. 7, 2019

(51) Int. Cl.
  *F21V 5/04*  (2006.01)
  *F21Y 115/10*  (2016.01)
(52) U.S. Cl.
  CPC .............. *F21V 5/04* (2013.01); *F21Y 2115/10* (2016.08)
(58) Field of Classification Search
  CPC ........................................ F21V 5/046
  USPC ................ 362/308–309, 311.2, 326, 329
  See application file for complete search history.

(56) References Cited

U.S. PATENT DOCUMENTS

| | | | | |
|---|---|---|---|---|
| 4,474,437 A * | 10/1984 | Gorenstein | ............ | G09B 23/22 359/718 |
| 6,356,395 B1 * | 3/2002 | Tawa | ............ | G02B 3/0056 359/641 |
| 7,181,378 B2 | 2/2007 | Benitez et al. | | |
| 7,580,192 B1 | 8/2009 | Chu et al. | | |
| 8,264,922 B2 * | 9/2012 | Takeuchi | ............ | G11B 7/0909 369/112.01 |
| 8,696,175 B2 | 4/2014 | Yoon et al. | | |
| 8,967,833 B2 | 3/2015 | Wang et al. | | |
| 9,163,805 B2 | 10/2015 | Han et al. | | |
| 9,416,926 B2 * | 8/2016 | Wilcox | ............ | G02B 19/0028 |
| 9,484,510 B2 | 11/2016 | Kim | | |
| 9,574,737 B2 | 2/2017 | Park et al. | | |
| 10,119,662 B2 * | 11/2018 | Wilcox | ............ | F21K 9/69 |
| 2003/0137838 A1 | 7/2003 | Rizkin et al. | | |
| 2004/0207999 A1 * | 10/2004 | Suehiro | ............ | G02B 6/0018 362/84 |
| 2007/0230191 A1 * | 10/2007 | Komuro | ............ | F21V 7/22 362/341 |
| 2009/0109687 A1 | 4/2009 | Householder et al. | | |
| 2010/0271708 A1 * | 10/2010 | Wilcox | ............ | G02B 17/0856 359/654 |
| 2011/0080725 A1 | 4/2011 | Brands et al. | | |

(Continued)

FOREIGN PATENT DOCUMENTS

EP         2843301 A1    3/2015

*Primary Examiner* — Evan P Dzierzynski
*Assistant Examiner* — Keith G. Delahoussaye
(74) *Attorney, Agent, or Firm* — Louis S. Horvath

(57) ABSTRACT

An illumination apparatus has a light source having a planar emission surface and a centroid, wherein the surface has a maximum distance L between opposite edges. A lens has an incident surface and an optical axis. In cross section along the optical axis, the incident surface, at a first incident point, is concave or flat to light emitted at a normal from the emissive surface. At a second incident point, the surface an instantaneous angle of curvature, relative to the emissive surface, with an absolute value of no more than 25 degrees to light emitted at an oblique angle greater than 75 degrees from the emissive surface normal. Considered in parallel to the optical axis, the second incident point is within a less than 0.2 L from the first plane. In an orthogonal direction to the optical axis, the second incident point lies within less than 2 L from the centroid.

16 Claims, 16 Drawing Sheets

(56) References Cited

U.S. PATENT DOCUMENTS

| | | | |
|---|---|---|---|
| 2014/0126222 A1* | 5/2014 | Wang | F21V 5/043 |
| | | | 362/311.09 |
| 2016/0161084 A1* | 6/2016 | Cho | G02B 19/0061 |
| | | | 362/235 |
| 2016/0238202 A1 | 8/2016 | Mallory et al. | |
| 2017/0074483 A1* | 3/2017 | Yu | F21V 5/045 |
| 2018/0294389 A1* | 10/2018 | Tarsa | F21V 5/007 |

\* cited by examiner

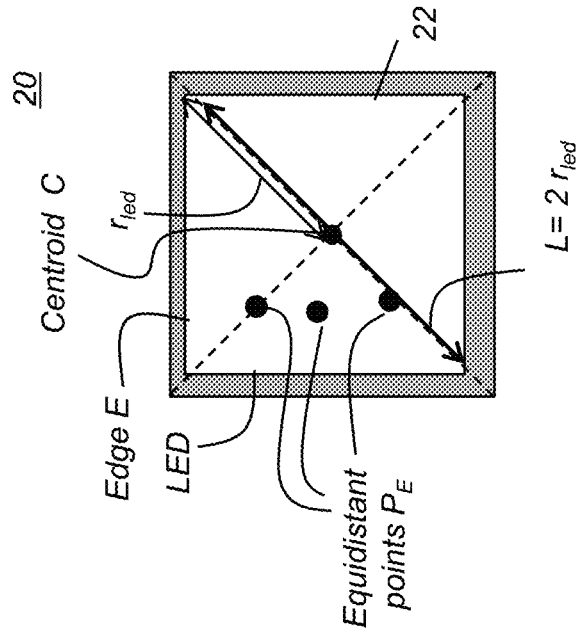
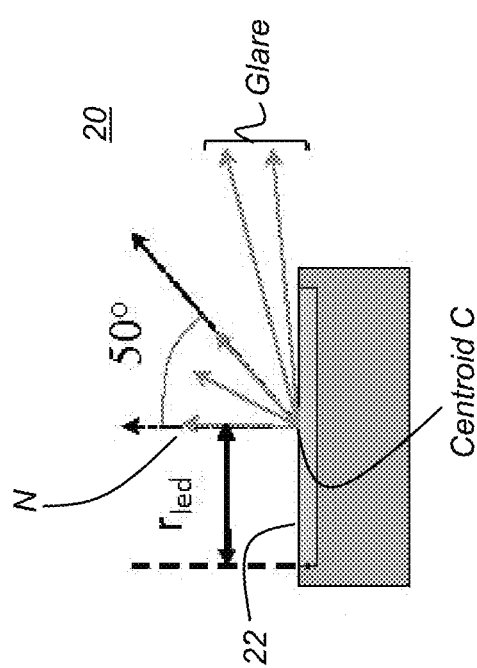
FIG. 1B
FIG. 1A

LIGHT DISTRIBUTION FOR PLANAR PHOTONIC COMPONENT

FIELD OF THE INVENTION

The present disclosure is directed to improved efficiency for solid-state photonic components and more particularly to photonic components having planar surfaces that emit or absorb light energy.

BACKGROUND OF THE INVENTION

Solid-state photonic components have provided a number of improvements in light efficiency for both light emission and detection. As a result of continued developments in Light Emitting Diode (LED) technology, LEDs have emerged as the preferred light source in a number of applications. Among benefits of solid-state lighting (SSL) using LED sources are long life and durability, energy savings per lumen, good quality light output, low heat, and compact size.

As LEDs continue to supplant conventional light sources in large-scale illumination applications such as high-bay lighting, developers and manufacturers have recognized some of the shortcomings and constraints related to solid-state light emission. In order to provide high-output lighting, for example, it is recognized that operating current of the LEDs can make a significant difference in light efficiency. Improved efficiencies for LED emission are typically obtained by powering the LEDs below their rated nominal component current capacity. However, reduced current, while improving efficiency, leads to lower light output per LED, resulting in the requirement to increase the quantity of LEDs in order to achieve a required light output. In some applications, the available surface area of the lighting system for mounting LEDs may be the practical limit to system efficiency.

Solid-state LEDs having a planar output surface can be the preferred option where high-density packaging is needed to provide high levels of light. These devices can include surface mounted devices (SMDs) such as the LUXEON™ 3030 LED from Lumileds Holding B.V., San Jose, Calif., for example.

Surface-mounted LEDs typically exhibit a highly Lambertian optical distribution. This means that a substantial portion of the generated light exits the flat LED emission surface at relatively high angles. Without proper correction, the light emitted at such high angles can be a source of undesirable glare. Typically, individual lenses are paired with each LED package to redirect high-angle light for a more useful optical distribution. Lens sizes exceed LED package sizes; thus, the lens ultimately determines the maximum allowable LED density and, therefore, constrains the efficiency of the lighting system. It advantageous to have lens designs that are as small and efficient as possible to increase the efficiency of lighting systems using LEDs. Improvements in light handling, such as in more effective management of incident light angles, can also be advantageous for photonic components designed to detect light as sensors, such as detectors, detector arrays, CCD (charge-coupled device) arrays, and the like. Light at high incident angles can be more difficult to detect or may be incident on a neighboring sensor, resulting in unwanted crosstalk.

Thus, it can be appreciated that there would be benefits to light management solutions that improve light efficiency for surface-mounted photonic emission and detection components.

SUMMARY OF THE INVENTION

It is an object of the present disclosure to advance the photonics art.

The present disclosure is directed to overcoming one or more of the problems set forth above. Briefly summarized, according to one aspect of the present invention, there is provided an illumination apparatus comprising:

a) a solid-state light source having a planar emission surface that extends along a first plane and has a centroid, wherein the planar emission surface has a maximum distance dimension L measured along a line extended between opposite edges of the planar emission surface and through the centroid; and b) a lens that has an incident surface that is spaced apart from the planar emission surface and that has an optical axis normal to the emission surface, wherein, considered in a cross section along the optical axis, the incident surface:

(i) at a first incident point, is concave or flat to light emitted at a normal from a first emissive point on the emissive surface;

(ii) at a second incident point, has an instantaneous angle of curvature, relative to the first plane, with an absolute value of no more than 25 degrees, to light emitted at an oblique angle greater than 75 degrees from the emissive surface normal from a second emissive point on the emission surface, wherein, considered in a parallel direction to the optical axis, the second incident point is within a first distance less than 0.2 L away from the first plane, and wherein, in an orthogonal direction to the optical axis, the second incident point lies within a second distance less than 2 L from the centroid.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 1A is a schematic cross-section of a solid-state light source having a planar emission surface.

FIG. 1B is a schematic top view that shows a rectangular emissive surface with a centroid at the intersection of opposing diagonals.

DETAILED DESCRIPTION OF THE INVENTION

Figure 1C:
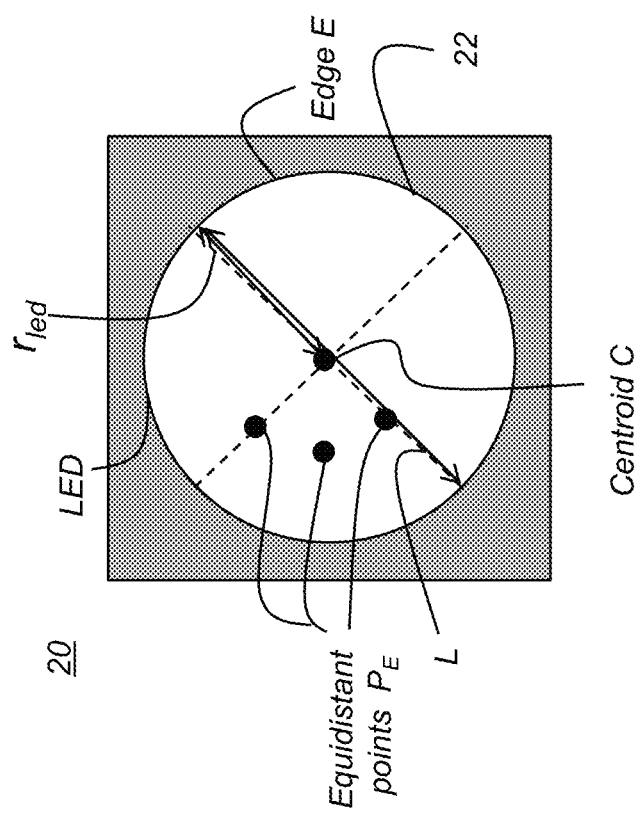
FIG. 1C is a schematic top view that shows a circular emissive surface.

Exemplary embodiments described herein provide an overall understanding of structural and functional features, manufacture, and use of devices and methods related to the present disclosure. In the present description, directed in particular to elements forming part of, or cooperating more directly with, apparatus in accordance with the invention, elements not specifically shown or described may take various forms well known to those skilled in the art.

Figures shown and described herein are provided to illustrate key principles of operation and component relationships along their respective optical paths according to the present disclosure and are not drawn with intent to show actual size or scale. In some cases, distances between features may be exaggerated in order to allow space and visibility of component numbering and labeling.

Where they are used, the terms "first", "second", "third", "fourth", and so on, do not necessarily denote any ordinal or priority relation, but are simply used to more clearly distinguish one element from another.

Various relative terms such as "above," "below," "top," "bottom," "height," "depth," "width," and "length," etc. may be used in the present disclosure to facilitate description of various embodiments and to help distinguish one side or surface of a component or assembly from its opposite side or surface or to distinguish different views or dimensions. The relative terms are defined with respect to a conventional orientation of a structure and do not necessarily represent an actual orientation of the structure in manufacture or use. The following detailed description is, therefore, not to be taken in a limiting sense as to component orientation or configuration.

The term "surface" has its conventional meaning as used in geometry, indicating a generally planar face of an object, where the face is considered to have length and breadth, but without thickness. For an optical component, the surface can be treated to sense or condition incident light, such as to reflect, scatter, absorb or filter light, or can be an emissive surface.

The term "edge" has its conventional meaning, denoting a border or margin where a surface ends, and can be considered to have thickness, but no length or breadth. The periphery of an optical surface can be considered to be that portion of the surface that lies along the edge and, in optical terms, lies outside of the clear aperture.

The term "oblique" is used herein to refer to an angular relationship that is other than substantially orthogonal or parallel, that is, at least about 5 degrees or more, but less than 90 degrees, with respect to a reference axis or surface.

The term "photonic component" is used to generally describe a component that generates light or that senses light, generally in the visible range (approximately 380-750 nm), the infrared range (approximately 750-2000 nm) or UV range (approximately 240 nm to 380 nm). Exemplary photonic emitters include Light Emitting Diode (LED) devices. "Photonic component" may also be photonic sensors or light detectors that provide some type of output signal in response to light energy.

Embodiments of the present disclosure are directed to light conveyance from or toward a photonic component having a planar component surface. For illumination applications, this includes LEDs such as the emissive devices noted previously in the background section. For light detection, a variety of light sensors, formed as surface-mount or low-profile sensor devices, can also be used. For the purpose of description, the specification primarily focuses on illumination apparatus employing LEDs and similar SSL illumination devices. However, it must be noted that similar optical structures can be employed for sensor devices having substantially planar input surfaces. Features of the present disclosure can help to improve light management and efficiency for conveyed light traveling to or from a planar photonic surface.

In the description that follows, angles are described with reference to a normal to the surface, unless otherwise specified. A light beam parallel to normal is at 0 degrees; a light beam orthogonal to the normal is at 90 degrees.

A cross section along the optical axis, as shown in subsequent figures, can be considered to be taken using a sectioning plane that includes the optical axis.

FIG. 1A is a cross-section of a solid-state light emitter or light source 20 having a planar emission surface 22 and showing some features and dimensions related to the description that follows. A centroid C is at the center of surface 22 and is the 2D geometric center of LED rectangular emission surface 22. FIG. 1B shows a top view of a rectangular emissive surface 22, with centroid C at the intersection of opposing diagonals for rectangular surface 22. FIG. 1C shows a top view of a circular surface 22, with centroid C at the geometric center of the defined circle. A radius $r_{led}$ relates to the maximum distance between centroid C and an edge E of surface 22. A distance dimension L represents the maximum distance, through centroid C, between furthest points or corners on extreme opposite edges E of surface 22; in FIG. 1B, this maximum distance dimension L is across the diagonal from one corner to the opposite corner of surface 22. In FIG. 1C, maximum distance dimension L across the circular surface 22 is simply the diameter or twice the radius:

$$L=2r_{led}.$$

For the purposes of the present disclosure, the majority, for example greater than 90% or greater than 95% of total light emitted from the solid-state light source is outward from the planar emission surface 22. With such a restriction, the majority of light is above the planar emission surface 22 in the orientation used in figures of the present disclosure; thus the embodiment of the lens structures shown for this invention is optimized for this light emission at or above planar emission surface 22.

Equidistant points $P_E$ lie midway between centroid C and the nearest edge E in a line defined by centroid C and the point $P_E$. Only a small number of points $P_E$ are represented in FIGS. 1B and 1C.

FIG. 1A shows a portion of the light emitted at well beyond 50 degrees from a normal N shown extending from the surface 22 at centroid C. This portion of light, emitted at relatively high angles, causes glare and is typically highly undesirable.

Figure 2:
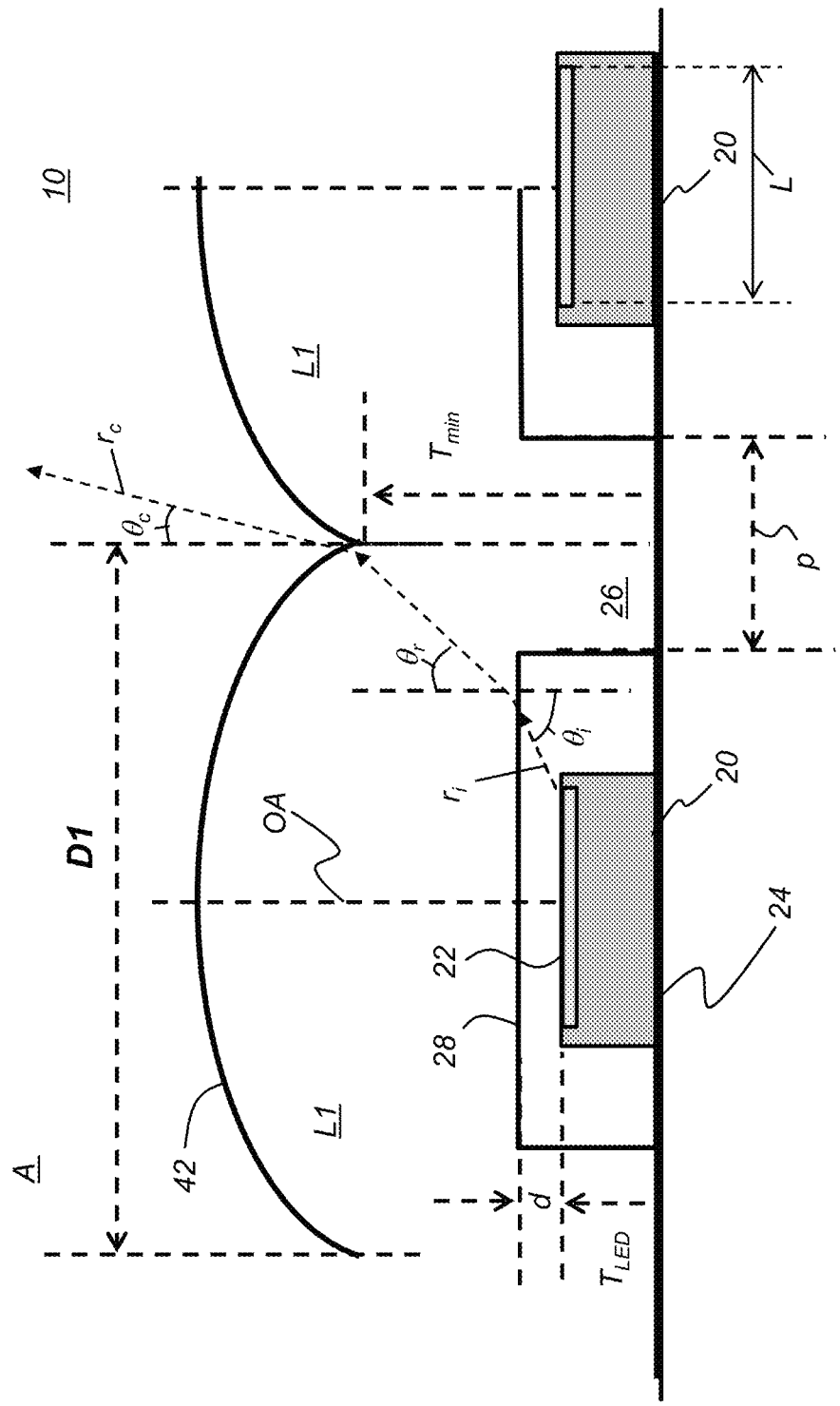
FIG. 2 shows, in cross section through the centroid, aspects of the conventional approach for redirecting emitted light at relatively high angles.

FIG. 2 shows, in cross section taken through the centroid C and along the optical axis OA, aspects of a conventional approach for redirecting light emitted from surface 22 at relatively high angles in an illumination apparatus 10 formed as part of an array A. A lens L1 having a diameter D1 is provided for redirecting emitted light output from each light source 20 in an array A. Planar emission source 22 is at a distance $T_{LED}$ from a base 24, which lies on a printed circuit board or other supporting surface. There is a minimum clearance distance d between emission surface 22 and an incident surface 28 of lens L1. Generally, reducing distance d reduces wasted high-angle light that could otherwise miss incident optical surface 28. However, distance d reduction is constrained by manufacturing tolerances; there must be sufficient space between emitting surface 22 and incident surface 28 to allow assembly of the illumination apparatus of array A without unintended contact between surfaces 22 and 28. Thus, in practice, the distance d much be generally exceed a minimum distance such as 0.1 L, 0.2 L, or 0.3 L, for example. A protrusion portion 26 between the lenses L1 of array A and having a width p also lies against the circuit board surface. Protrusion portion 26 lies along a lens boundary and can act as a standoff for lens L1 mounting and can allow lens L1 to at least partially enclose, encase, or surround the edges of the photonic component such as emission surface 22.

Still referring to FIG. 2, there is a distance $T_{min}$ between the base and a minimum height of an exit surface 42 along the edge of lens L1. Reducing the $T_{min}$ dimension generally also reduces the lens diameter D1. However, for practical fabrication, there are limitations to how small $T_{min}$ can be, thus limiting how small the lens diameter D1 can be. Using plastic injection molding processes, for example, a minimum $T_{min}$ dimension for fabrication may be on the order of 0.5-1.5 mm.

High-angle light along a ray $r_i$, emitted at angle $\theta_i$ can be redirected by refraction at incident surface 22 of lens L1, to reduced angles $\theta_r$ within lens L1, then to angle $\theta_c$ at exit surface 42 as shown, exiting lens L1 along ray $r_c$. Reduced-angle light is inclined at corrected angles nearer to normal, as represented by optical axis OA of the lens L1 in FIG. 2 and subsequently.

Among difficulties with lens L1 as in FIG. 2 are performance constraints; only a small adjustment can be provided to the angle of emitted light using this type of solution. Light that is emitted from surface 22 at more extreme angles, such as at angles greater than 50 degrees from normal, can be wasted, contributing to glare.

To address these difficulties and other shortcomings of the conventional approach, the Applicant has designed a lens that has an incident curvature for surface 28 in FIG. 2 that is adapted for improved efficiency and for redirection of high angle light output from planar emissive devices to more useful angles, more inclined toward the optical axis OA of the lens in order to help reduce glare and to provide improved optical distribution over conventional devices.

Incident Surface

Figure 3:
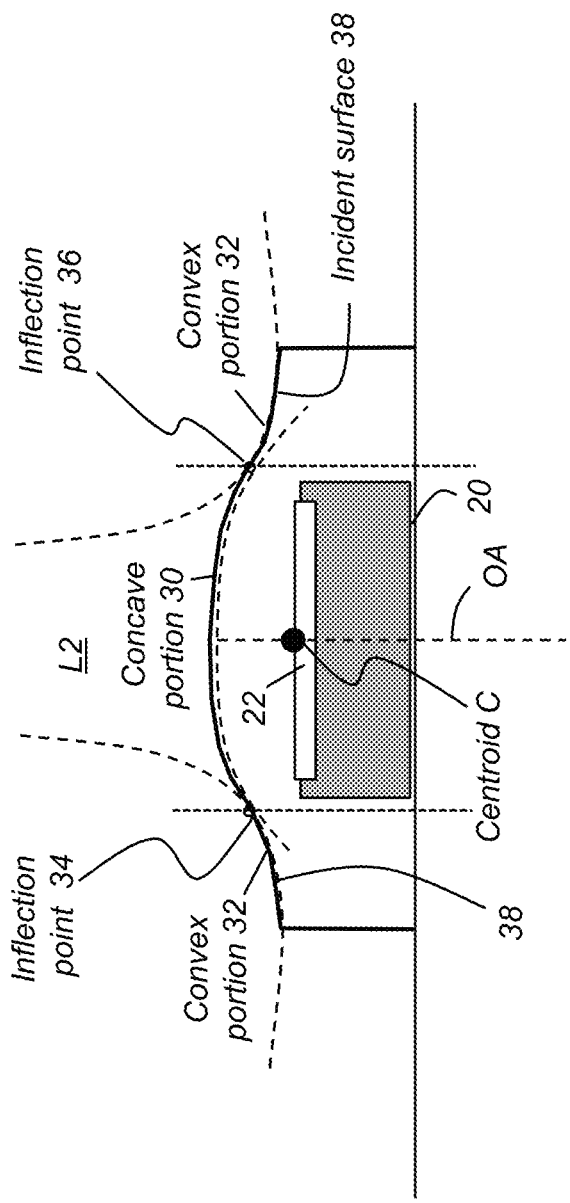
FIG. 3 is a cross-sectional schematic that shows features of an incident surface for light redirection according to an embodiment of the present disclosure.
Figure 4:
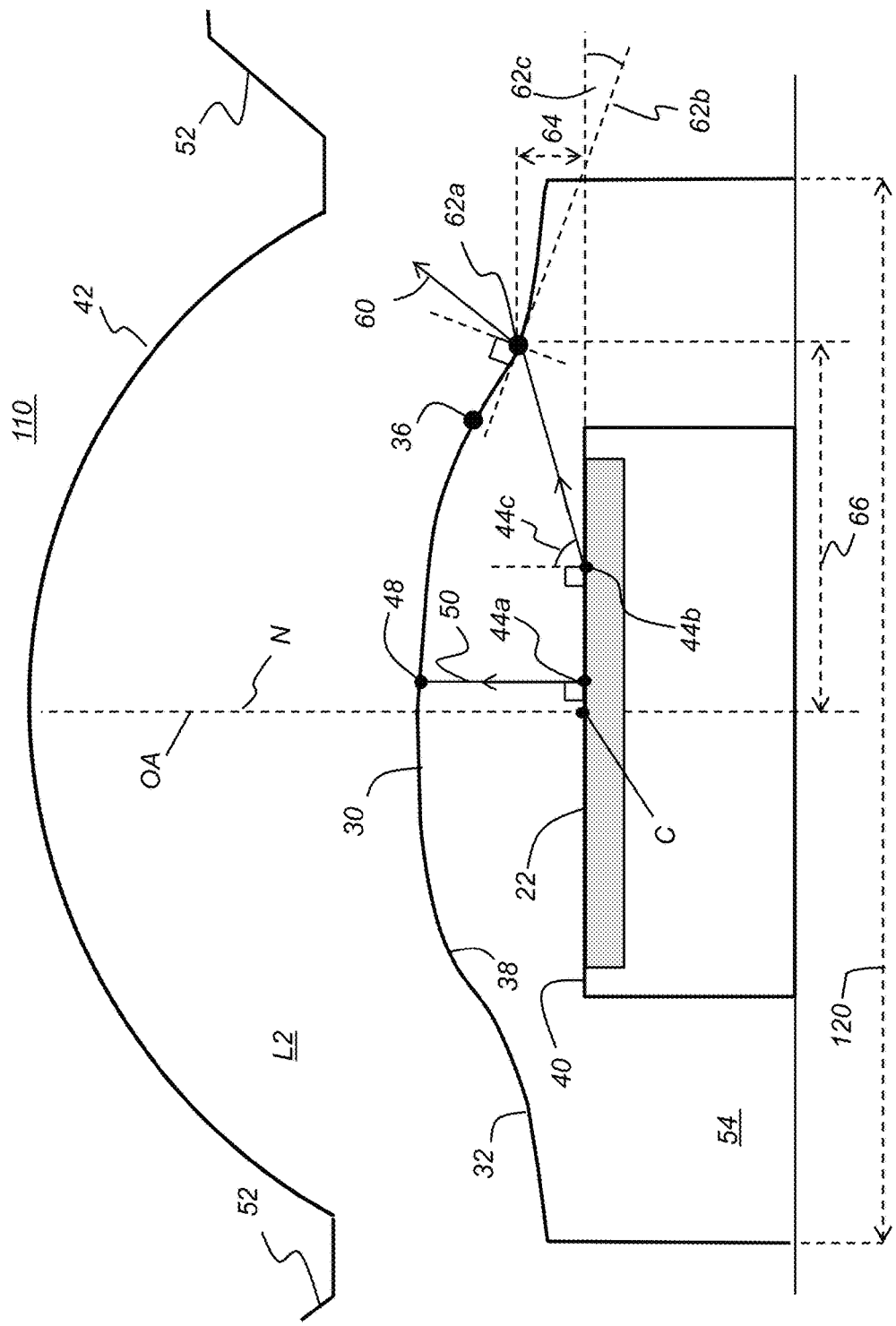
FIG. 4 is a cross-sectional schematic that shows features of an illumination apparatus.

The cross-sectional side views of FIGS. 3 and 4 taken through centroid C, which can be coincident with the lens optical axis OA, show various aspects of an incident surface 38 for a lens L2 that provides improved light redirection for light emitted from planar photonic surface 22. It should be noted that there is no requirement that lens L2 or that the emissive or sensing photonic device be symmetric about the optical axis or centroid. FIGS. 3, 4, and subsequent figures show one possible cross section through the centroid. Later figures show the outline of lens L2 with both incident surface 38 and output surfaces 42 in more detail. The incident curvature described with particular reference to FIGS. 3 and 4 has particular geometry that is designed to address problems of glare and redirection of light emitted from a planar photonic surface 22, where the emitted light is at relatively high angles relative to the optical axis.

As shown in FIG. 3, the curvature of incident surface 38 has a concave portion 30, centered about lens optical axis OA and ideally suited to provide an optical path for light from surface 22, wherein the emitted light is at a normal to the surface or at some other near-normal angle, such as generally within no more than 20 or 40 degrees from normal. The normal to surface 22 is parallel to lens optical axis OA. A moderate amount of refraction is provided for near-normal light from surface 22. The curvature of incident surface 38 can further have a convex portion 32 that is suited to provide an optical path for light that is emitted at more extreme angles with relation to normal, such as for light deviated by 55 degrees or more from normal. This surface curvature of the incident lens surface 38 effectively provides more complete and aggressive refraction for high-angle light from surface 22 in order to redirect this light at angles inclined more toward the optical axis OA of the illumination lens L2.

Referring to FIG. 4, a first optical path 50 shows light emitted at point 44a of surface 22, wherein the emitted light is at a normal to surface 22. For light emitted at a normal angle, or near-normal angle that is within at least +/−30 degrees from normal N, light path 50 is incident on concave or flat portion 30 of incident surface 38, shown at a first incident point 48 in the example of FIG. 4.

In the FIG. 4 representation, planar emissive surface 22 lies within a component plane 40; component plane 40 is equivalent to the plane of the photonic component, here, defined in the plane of planar surface 22.

Continuing with FIG. 4, a second optical path 60 applies for light emitted from surface 22 at an oblique angle 44c of greater than 75 degrees from the emissive surface normal N, that is, greater than 75 degrees from the angle of optical axis OA. Light of this oblique angle is exemplified being emitted at a point 44b of surface 22. This light is incident at a second incident point 62a on incident surface 38. At incident point 62a, the slope or instantaneous angle 62b, relative to the plane 40 of the photonic surface 22, has an absolute value of 25 degrees or less. According to an alternate embodiment, relative to component plane 40, instantaneous angle, gradient, or slope 62b of incident surface 38 at an incident point 62a has an absolute angle 62c of less than 15 degrees or less than 10 degrees.

According to an embodiment of the present disclosure as shown in FIG. 4, the incident surface 38 comprises both a concave or flat portion 30 and a convex portion 32, with an inflection point 36 at the slope transition between the concave and convex portions. Significantly, the second incident point 62a is at or beyond a given horizontal distance of the second inflection point 36 away from the centroid C.

It should be noted that there can also be one or more flat portions of incident surface 38, such as in the near vicinity of the intersection of surface 38 with lens optical axis OA.

For embodiments of the present disclosure, dimensions of the emissive or sensing photonic surface, as outlined previously with respect to FIGS. 1A-1C, have been found to be useful for guiding the design of lens L2 curvature, spacing, and structure. Edge-to-edge distance L appears to be particularly determinative. Incident surface 38 of lens L2 can have a breadth 120 of less than 2.0 L, measured in cross section and in a direction orthogonal to the optical axis OA, as shown in FIG. 4.

Two orthogonal distance constraints are noted and shown in FIG. 4, using maximum distance dimension L that is defined along the component plane 40 of the photonic surface 22, as described previously with reference to FIGS. 1B and 1C:

(i) in the direction parallel to the lens optical axis OA (the vertical distance for lens L2 in the drawing representation of FIG. 4 for example), the second incident point 62a is within a first distance 64 that is less than 0.3 L from component plane 40 and may be less than 0.2 L or less than 0.1 L distance from component plane 40; and (ii) in a direction orthogonal to the lens optical axis OA, the second incident point 62a lies within a second distance 66 that is less than 2 L from the centroid C, such as at 1.0 L or 0.7 L from the centroid C.

According to an embodiment of the present disclosure, inflection points 34 and 36 are both less than 2 L distance from the optical axis OA of lens L2 through centroid C.

According to an alternate embodiment of the present disclosure, lens L2 may display symmetry of various types, including: rotational symmetry about optical axis OA, reflection symmetry across one or more planes that fully include the optical axis, or quadrant symmetry.

The Applicant has found that this particular combination of curvatures and dimensional constraints, rigorously applied and related to active surface dimensions for the photonic device, can provide improved management of the highly Lambertian light output of the LED surface, without requiring excessive space for lens components. This helps to reduce glare by redirecting high-angle emitted light toward normal N and allows dense packaging of photonic components. It should be noted that convex portion 32 is optional; the desired relative slope of the surface for high angle light can be provided without requiring that the incident surface have convex curvature.

According to an alternate embodiment, emissive points 44a and 44b are coincident. That is, with reference to the light paths shown in FIGS. 3 and 4, light emitted from the same point on surface 22 can follow either first optical path 50 or second optical path 60, depending on the angle of emission. Thus, light emanating from the same point on surface 22 can be incident on concave or flat surface portion 30 or on convex surface portion 32, depending on the emission angle. In this way, light from the same emissive point can encounter either a concave or a convex incident surface for refraction, according to its angle.

According to an alternate embodiment of the present disclosure, light from any number of surface point locations can be incident on either convex or concave or flat surfaces depending on emission angle. For example, first and second optical paths 50, 60 that provide different incident curvature characteristics according to emission angle can be defined from the centroid C. That is, light emitted from centroid C having an emission angle at a normal to surface 22 is incident on flat or concave surface portion 30, while light emitted from centroid C having an emission angle at 75 or more degrees from normal (alternately stated, at 15 degrees or less from the component plane 40 of surface 22) can be incident on convex portion 32.

According to another alternate embodiment of the present disclosure, lens L2 defines a first optical path for light emitted at a normal from first emissive point 44a, wherein the first optical path is defined between the point 44a on surface 22 and a first incident point 48 on flat or concave portion 30. A second optical path is defined between a different, second emissive point 44b, such as from an equidistant point $P_E$ as shown in FIGS. 1B and 1C or from some other point on surface 22, wherein light emitted from the emissive surface at an oblique angle greater than 75 degrees from the emissive surface normal is incident on convex portion 32.

Figure 5B:
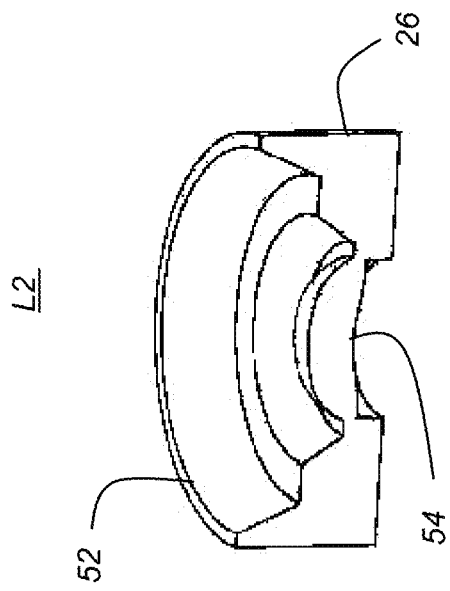
FIG. 5B is a perspective cross-section view of the lens of FIG. 5A.
Figure 5A:
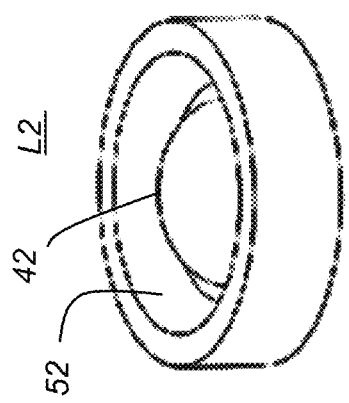
FIG. 5A is a perspective view showing a lens for improved light management according to an embodiment of the present disclosure.

FIGS. 5A and 5B show a perspective view and a perspective cross-section view, respectively, of lens L2. FIG. 5B shows an inner cavity 54 for encasing a photonic component, such as a surface-emitting LED light source. Edges of cavity 54 are defined and surrounded by protrusion portion 26. Surface 52 can comprise a baffle structure to limit high angle light.

Illumination Apparatus

Figure 6:
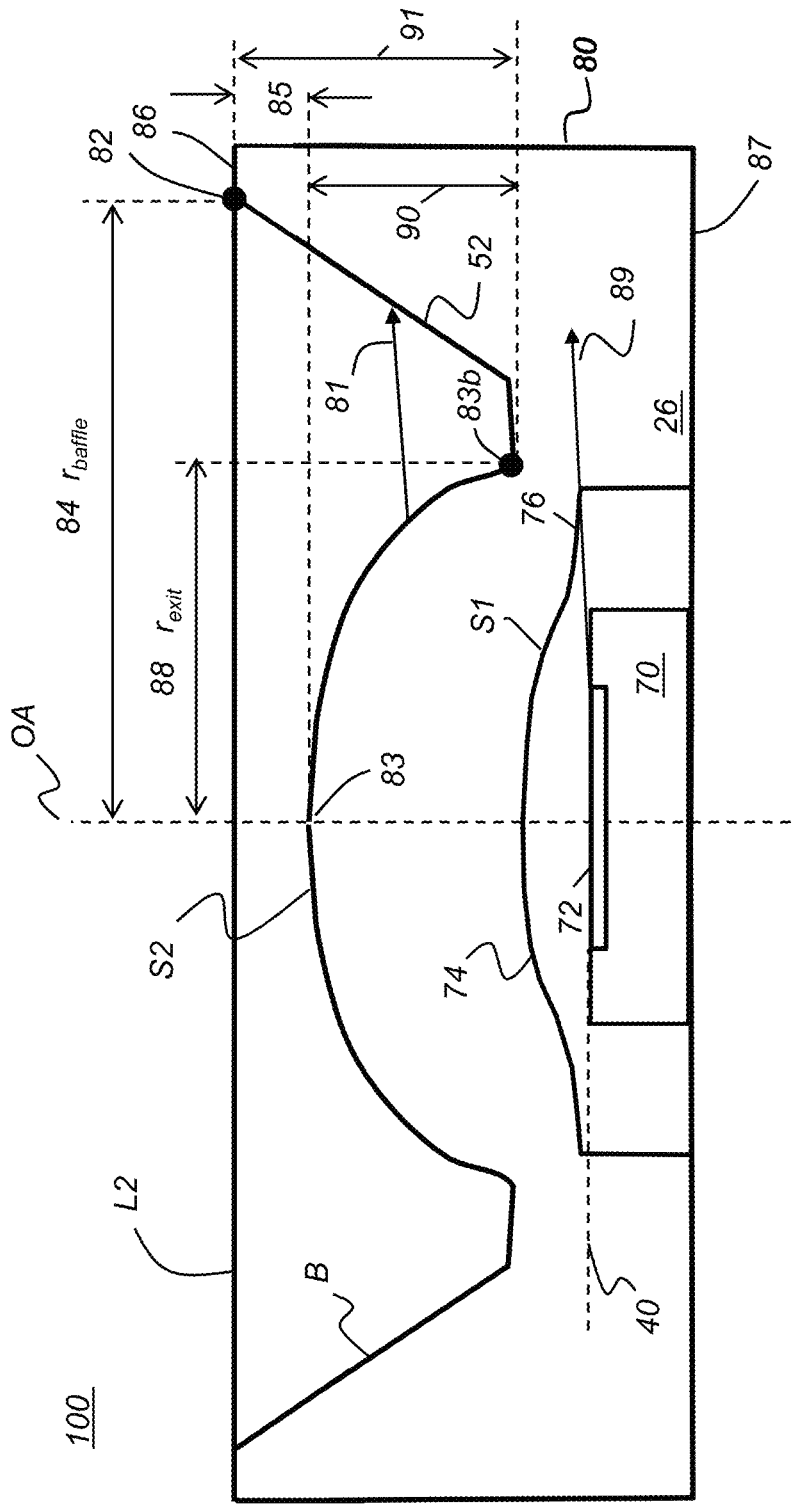
FIG. 6 is a cross-section view of an optical apparatus for light conveyance according to an embodiment of the present disclosure.

FIG. 6 shows a cross-sectional view of an optical apparatus 100 according to an embodiment of the present disclosure. As a photonic device, optical apparatus 100 can be an illumination apparatus, as described previously with reference to FIGS. 3-4, or can be a light-sensing apparatus that responds to incoming light, such as providing an output signal that is indicative of a light level and can alternatively measure one or more characteristics of incident light. The description that follows relates to the use of optical apparatus 100 for illumination; the optical path is reversed for use of apparatus 100 as a light-sensing device.

As shown in FIG. 6, an emissive photonic component 70 has a planar component surface 72 that defines component plane 40, as described previously for planar emission surface 22 of light source 20. Lens L2 has a first incident surface S1 that conveys light between points on the planar component surface 72 and lens L2. Surface S1 has the curvature features described for incident surface 38 with reference to FIGS. 3-4, with a concave or flat central portion 74 for conveying light that is incident at near normal angles and convex outlying portions 76 for conveying light that is incident at highly oblique angles with respect to normal.

Surface S2 is the outer surface of the lens with respect to the photonic component 70. At least a portion of second lens surface S2 is convex, such as the portion surrounding the lens optical axis OA. In an illumination embodiment, second lens surface S2 serves as an exit surface for the emitted light, providing a measure of light redirection as described herein.

Protrusion portion 26, as described previously with reference to FIG. 2, serves as a standoff, facilitating seating of lens L2 of optical apparatus 100 against a surface, such as that of a printed circuit board, for example. A base surface 87 seats against the printed circuit board or other supporting feature and serves as a reference surface for the height geometry described herein.

Although the lens surface combination of surfaces S1 and S2 are designed to minimize glare, high angle rays such as rays 81 or 89 can still result from the product of ghosting from multi surface reflections, high angle light from the LED, imperfections in fabrication, or inherent problems in the lens design. As a result, a baffle feature can be used to reduce these high angle rays.

Figure 7:
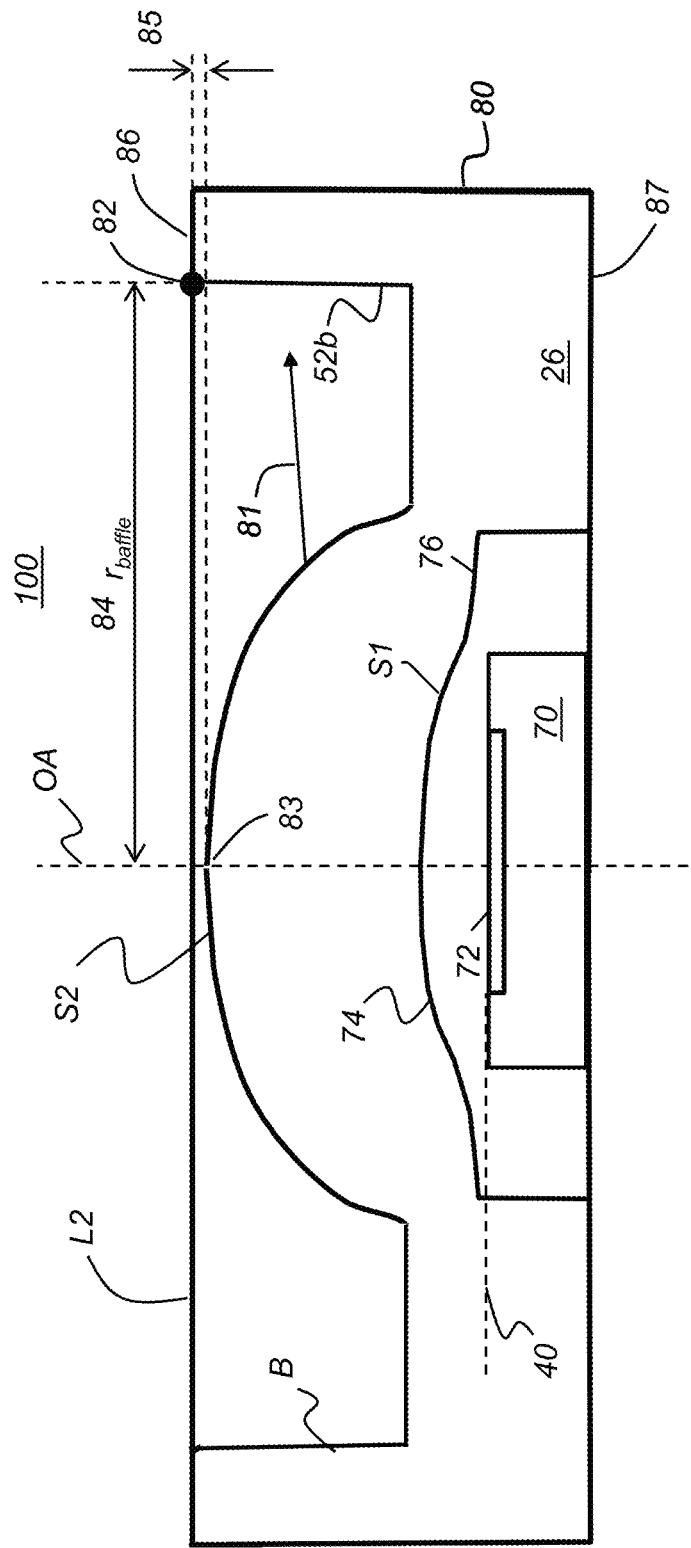
FIG. 7 is a cross-section view of an optical apparatus for light conveyance according to another embodiment of the present disclosure where the baffle has vertical side walls.
Figure 8:
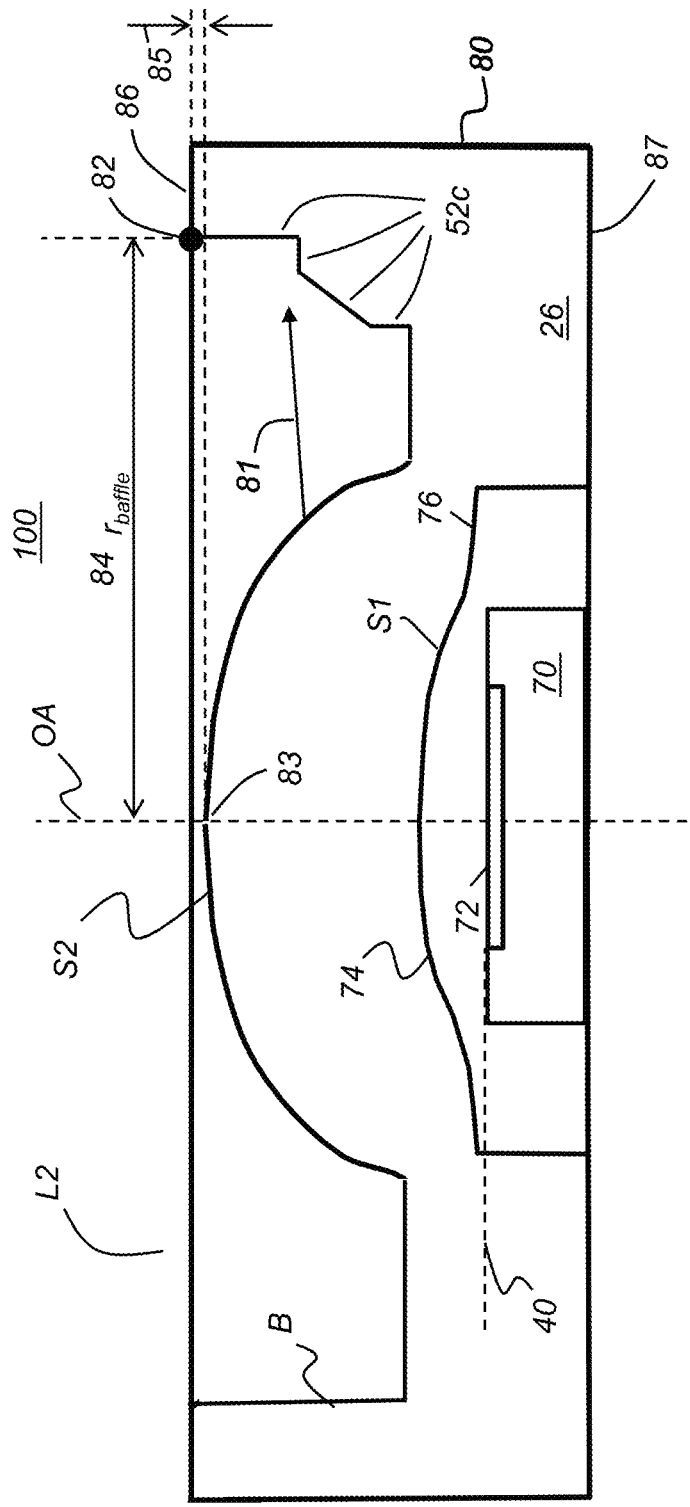
FIG. 8 is a cross-section view of an optical apparatus for light conveyance according to another embodiment of the present disclosure where the baffle has stepped side walls.

FIG. 6 shows one possible implementation of a baffle feature B consisting of a series of surfaces 52, 86, 80 and 87. FIG. 7 shows another possible baffle feature B implementation consisting of a series of surfaces 52b, 86, 80 and 87. FIG. 8 shows another implementation of a baffle feature B consisting of a series of surfaces 52c, 86, 80 and 87.

It should be noted that the term "height" as used in the context of the present disclosure does not limit the described lens geometry to directing light in the vertical direction. Height refers to the distance measured along an orthogonal line from base surface 87 and describes how far portions of the optical apparatus 100 extend from surface 87. In its application, the illumination apparatus can be oriented in any suitable direction, such as directing light upward, downward, or sideways at some angle, for example.

With respect to FIGS. 6-8, regardless of the exact contour of the baffle feature B, the baffle feature B has at least one baffle point 82, at the furthest distance along baffle B from the opposite surface 87, with a baffle height 91 that is at least 50% of the lens surface height 90, that is, the height dimension of the incident or exit surface S2, measured as described subsequently.

The baffle height 91 is defined as the distance from the baffle point 82 to a base 83b of the lens surface S2, wherein surface S2 is the curved surface that lies furthest from photonic component 70 in the cross-sectional aspect of FIGS. 6-8. Base 83b corresponds to the furthest edge or furthest outer perimeter of the curved surface S2 considered in the cross-section views of FIGS. 6-8. A surface radius 88 is the radius of curved surface 52 in the direction orthogonal to the optical axis OA; surface radius 88 extends from optical axis OA as far as base 83b. The dimension of surface radius 88 is labeled $r_{exit}$.

A lens surface height 90 extends parallel to the optical axis OA and is defined from the furthest extending portion of surface S2 at a point 83 to base 83b as shown in FIG. 6.

In addition, point 82 has horizontal distance 84 from the centroid, labeled $r_{baffle}$. Dimension $r_{baffle}$ is greater than one times the exit surface radius 88 ($r_{baffle} > 1\ r_{exit}$). Dimension $r_{baffle}$ can be greater than two times the exit surface radius 88 ($r_{baffle} > 2\ r_{exit}$), or greater than three times the exit surface radius 88 ($r_{baffle} > 3\ r_{exit}$).

Baffle Surface

Baffle B surfaces can be conditioned, such as by coatings, fabrication, or treatment, to have any of the following surface characteristics:

(i) Smooth Fresnel reflection.
(ii) Texture, conditioned to partially scatter the incident light in a transmitted forward or reflected backward direction.
(iii) Mirrored or highly reflective, conditioning the surface such as by coating with a thin layer of aluminum.
(iv) Scattering, such as through an applied coating material that conditions the surface to either scatter light backwards or absorb the light, or to provide a combination thereof. Such a coating material may be paint, such black, grey, white, or some other color paint.

Smooth fresnel or textured surfaces are preferred as they add little to no fabrication cost; surfaces of this type can be formed in the lens fabrication process, such as when using injection molding.

Mirror coatings are generally costly, typically requiring coatings to be applied in a vacuum chamber, with masking of surfaces that are not coated.

Painted surfaces are less costly than vacuum coated mirror surfaces, but require an additional fabrication step.

In an alternate embodiment, the baffle B structure can be formed in a second injection molding step, also known as co-molding, applying a second material on to the base lens material to effectively produce a single bonded together part. In a preferred embodiment where there is a co-molding process, the material in the second injection molding step is different than the first injection step, with the properties of the second material being absorbing, non-transparent, translucent, or scattering, such as with plastic materials including silicone.

Figure 9B:
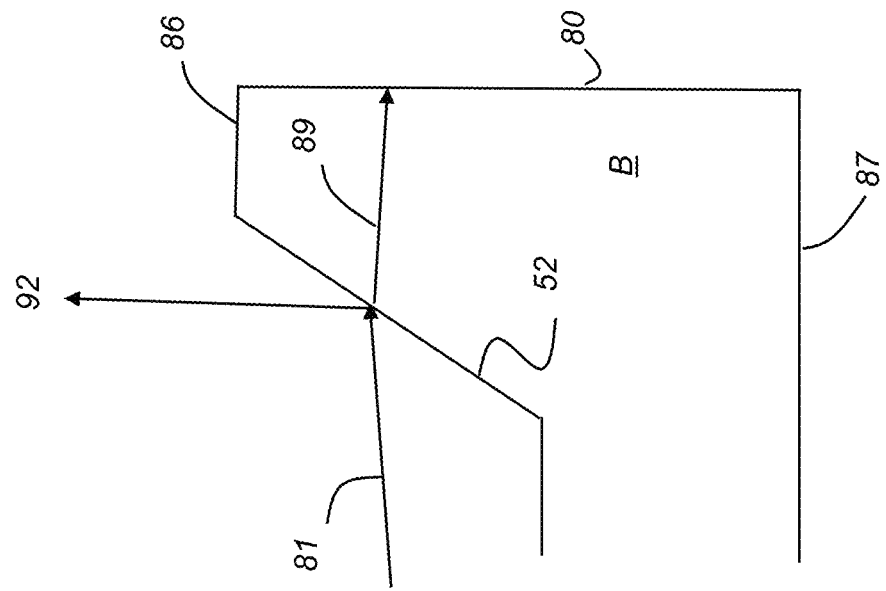
FIG. 9B is a cross-section view of the baffle structure with a first Fresnel surface and a second absorbing surface.
Figure 9A:
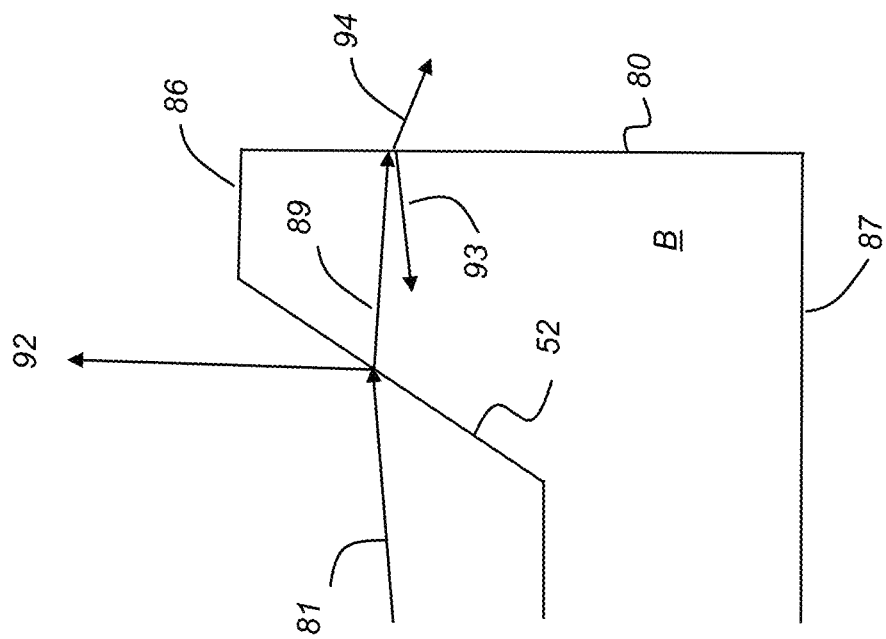
FIG. 9A is a cross-section view of the baffle structure with a first and second Fresnel surface.

FIG. 9A shows a possible implementation of the baffle B feature wherein surfaces 52 and 80 are smooth Fresnel surfaces. High angle ray 81, incident on surface 52, is split into a reflected ray 92 and a transmitted ray 89. Ray 89 is then incident on surface 80 and is split again into a reflected ray 93 and a transmitted ray 94. In one embodiment, judicious design of surfaces 52 and 80 causes reflected ray 92 to be emitted at a lower angle relative to emissive surface normal N, reducing glare. Transmitted ray 89 is then directed opposite to the direction of optical axis OA, thus also eliminating the ray from the glare zone.

FIG. 9B shows a baffle B arrangement similar to that of FIG. 6, with outer surface 80 having a coating that blocks transmission of light, such as ray 89. A suitable coating material can scatter the light backwards or partially absorb the incident ray. Such a coating material can include a coating of paint.

Figure 9D:
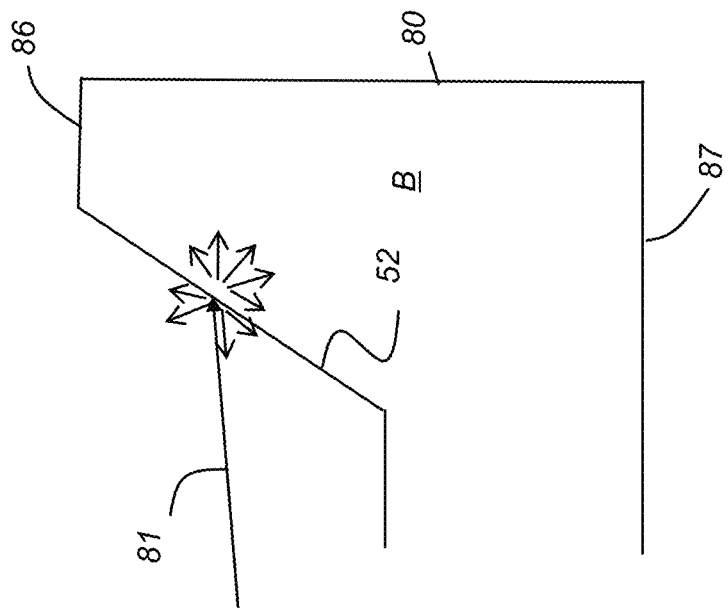
FIG. 9D is a cross-section view of the baffle structure with a first scattering surface.
Figure 9C:
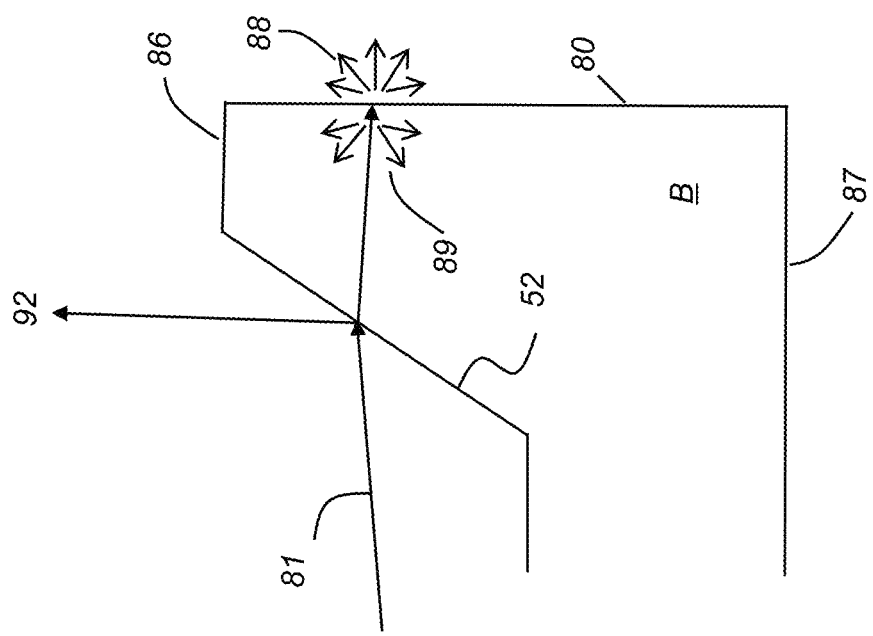
FIG. 9C is a cross-section view of the baffle structure with a first Fresnel surface and a second scattering surface.

FIG. 9C shows the FIG. 6 baffle B arrangement with surface 80 textured to scatter the light in one or more backward reflected directions as rays 89 and in a transmitted forward ray 88 direction.

In FIG. 9D, surface 52 is textured to scatter ray 81 in a reflected direction and a transmitted scatter direction.

Figure 10:
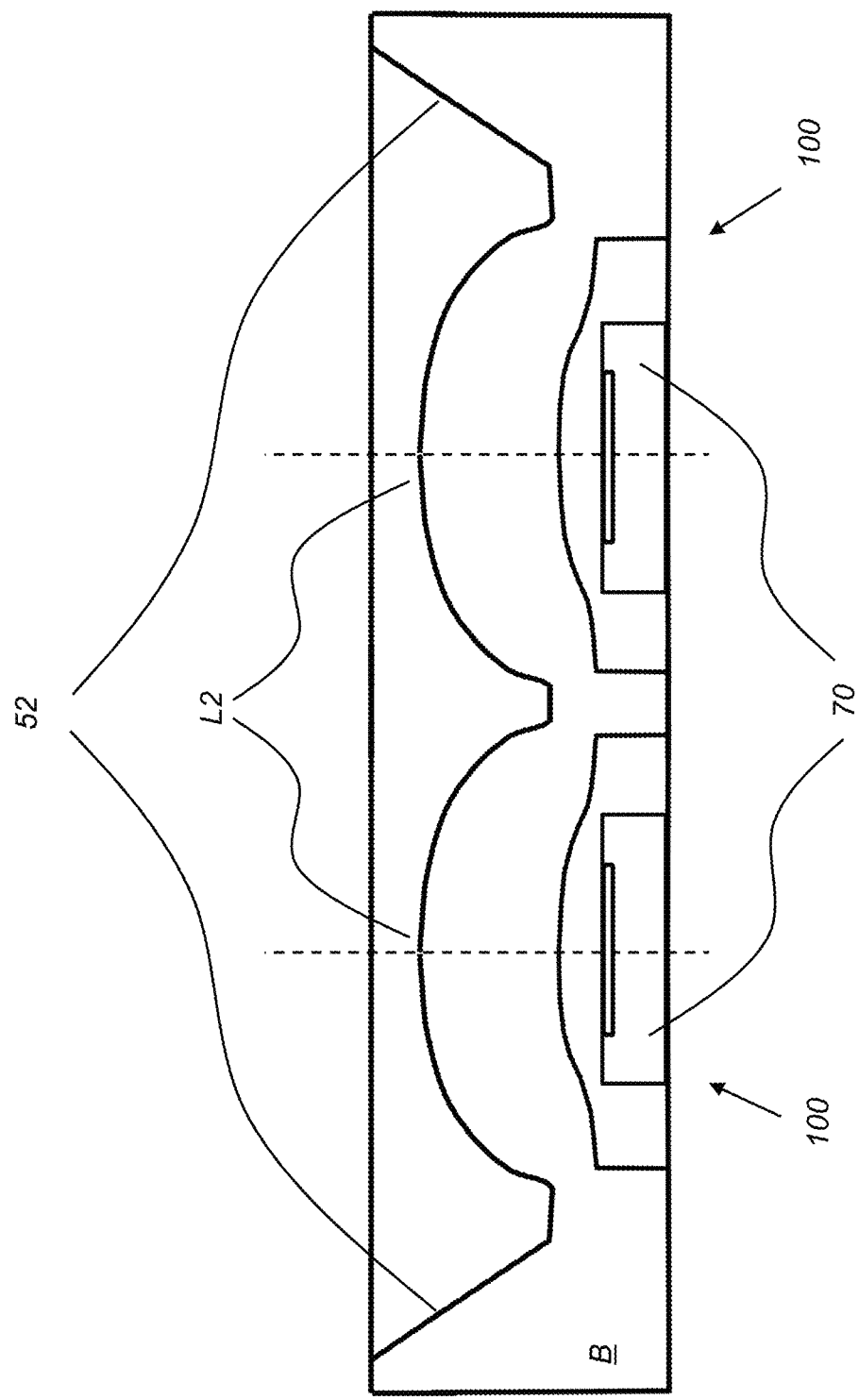
FIG. 10 is a side view of an optical apparatus having multiple lenses.

FIG. 10 is a side view that shows two optical apparatus 100 that share a single baffle B.

Illumination embodiments of the present disclosure address the need for more efficient management of highly Lambertian light that is generated from LEDs. By modifying the refractive handling of the light according to its angular range, the apparatus and methods disclosed herein help to reduce glare and redirect a substantial portion of highly angled light toward a normal for the LED. In the alternate direction, for light sensing, embodiments of the present disclosure help to more effectively manage incoming light energy for measurement and response.

Array Arrangement

Figure 11:
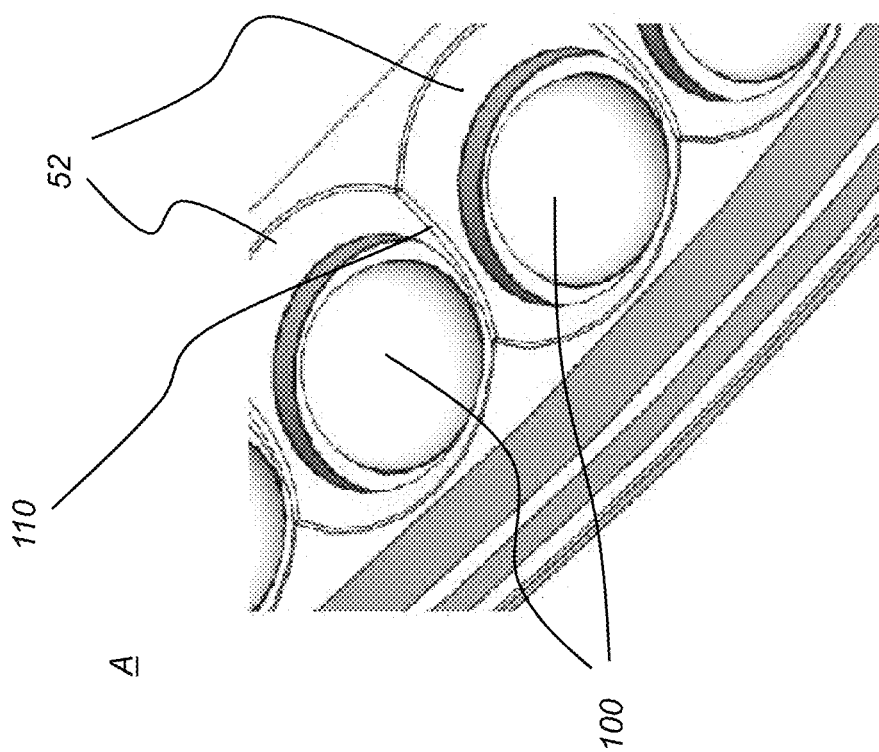
FIG. 11 is a perspective view showing a portion of an array with individual apparatus fitted against each other as adjacent elements

Particularly useful for illumination embodiments, optical apparatus 100 of FIGS. 6-8 can be arranged in an array, with individual apparatus 100 fitted against each other as adjacent elements, as shown in FIG. 11, with any of a number of modifications to suit packaging and operational requirements.

FIG. 11 shows, in perspective view, a portion of an array A having multiple optical apparatus 100 packed closely together according to an embodiment of the present disclosure. In the arrangement shown, arrayed baffle surfaces 52 can intersect and be partially truncated along an overlap 110, such as a straight line or curve as shown. Here, due to close packaging, individual baffle surfaces 52 are not rotationally symmetric, nor are these surfaces continuous about their own optical axes.

Figure 12:
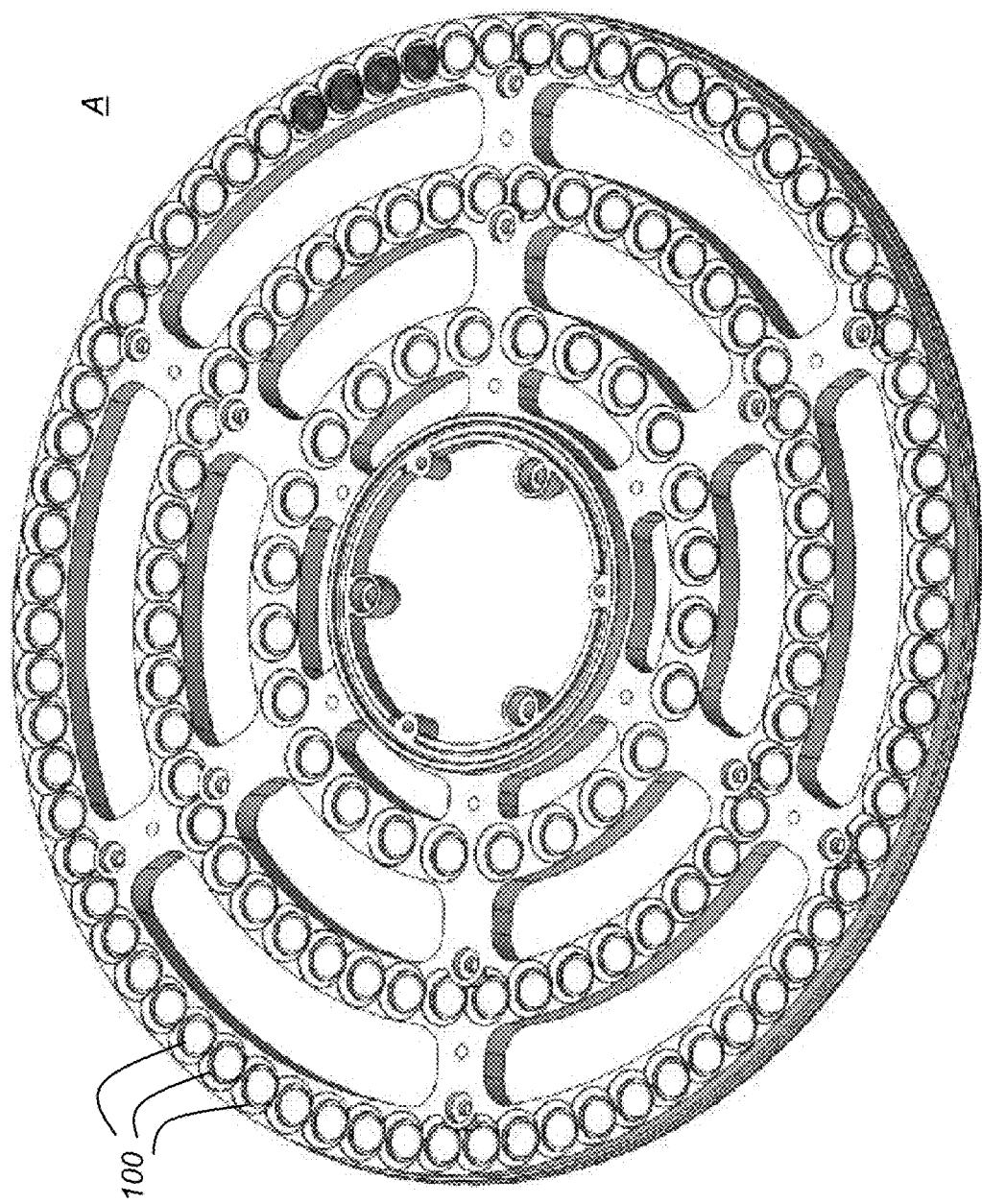
FIG. 12 is a perspective view of a large-scale illumination apparatus that uses an array of optical apparatus.

The perspective view of FIG. 12 shows a large-scale illumination array A that uses an arrangement with a number of optical apparatus 100 as described herein.

FIG. 11 and FIG. 12 show array A having a radial layout. It can readily be appreciated that multiple array layouts are possible with different arrangements, including linear, curved, two dimensional, etc.

Figure 13:
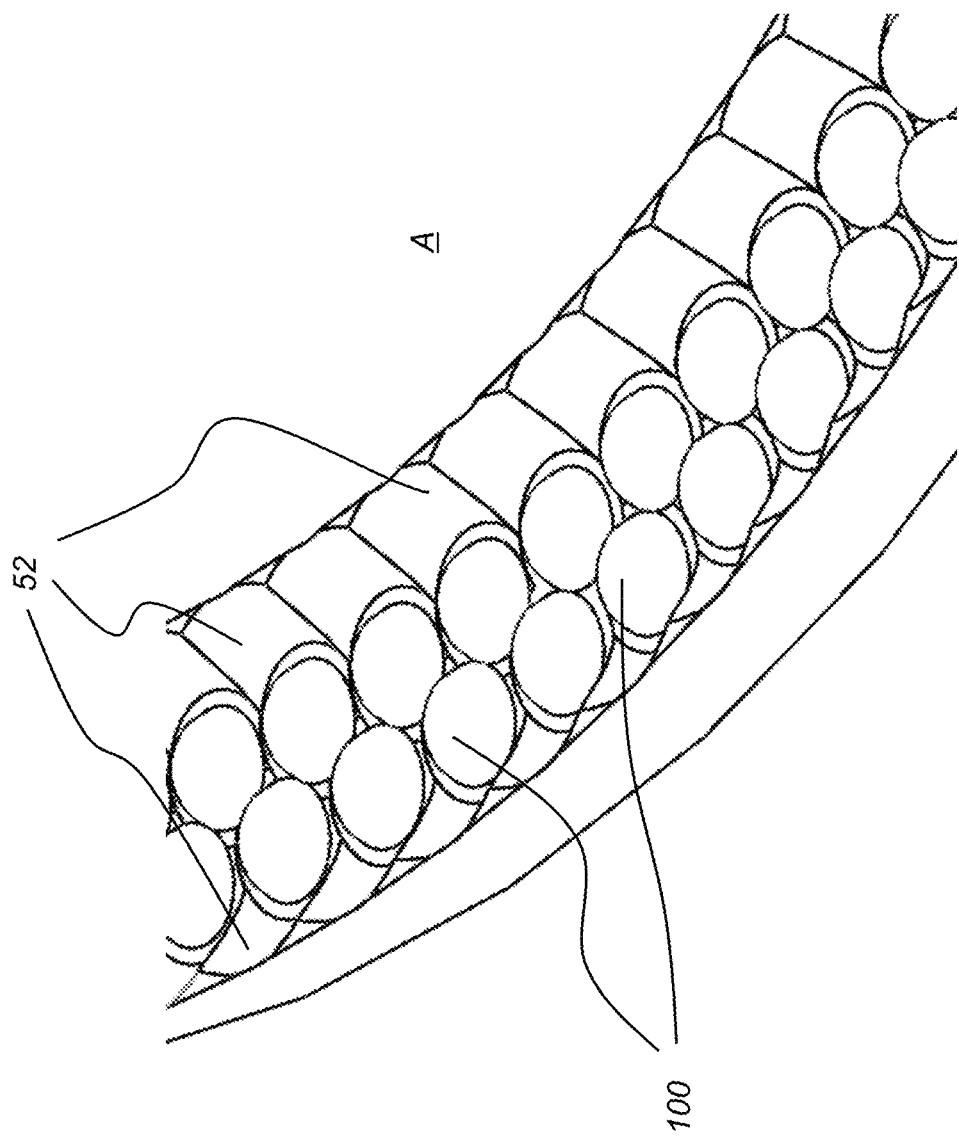
FIG. 13 is a perspective view that shows another arrangement of an array wherein there are concentric rings of an optical apparatus according to an embodiment of the present disclosure.

The perspective view of FIG. 13 shows another arrangement of array A wherein there are 2 concentric rings of optical apparatus 100. Here again, as in FIGS. 10 and 11, baffle surfaces 52 are not fully rotationally symmetric, nor are these baffle surfaces continuous about the optical axis of the corresponding optical apparatus 100. It should be noted that baffle B surfaces can have various treatments over all or over a portion of their surface area, as described previously with respect to FIGS. 9A-9D.

Fabrication

Lens L2 can be fabricated from various types of optical polymer using injection molding or other high-volume manufacturing methods. Suitable moldable polymers can include Poly(methyl methacrylate) PMMA, silicone, or TPX (Polymethylpentene (PMP)), acrylics, polystyrene, Cyclic Olefin Polymer (COP) resins, polycarbonate, Lexan™ polycarbonate, silicone, and the like. According to an embodiment of the present disclosure, minimum thickness for the lens L2 is typically in the range from 0.5 to 1.5 mm. Thickness of the lens from the incident surface 38 to the exit surface 42 can be greater than or equal to 1 mm.

In further embodiments of the present disclosure, optical distribution has an optical intensity in the glare zone of less than 10%, 5%, and less than 2% of the center optical intensity at the optical axis. In another embodiment of the present disclosure, the optical distribution has a light level in the glare zone of less than 10% and less than 5% of the total optical distribution. In another embodiment, the optical distribution has cutoff that can be less than 50 degrees.

Figure 14:
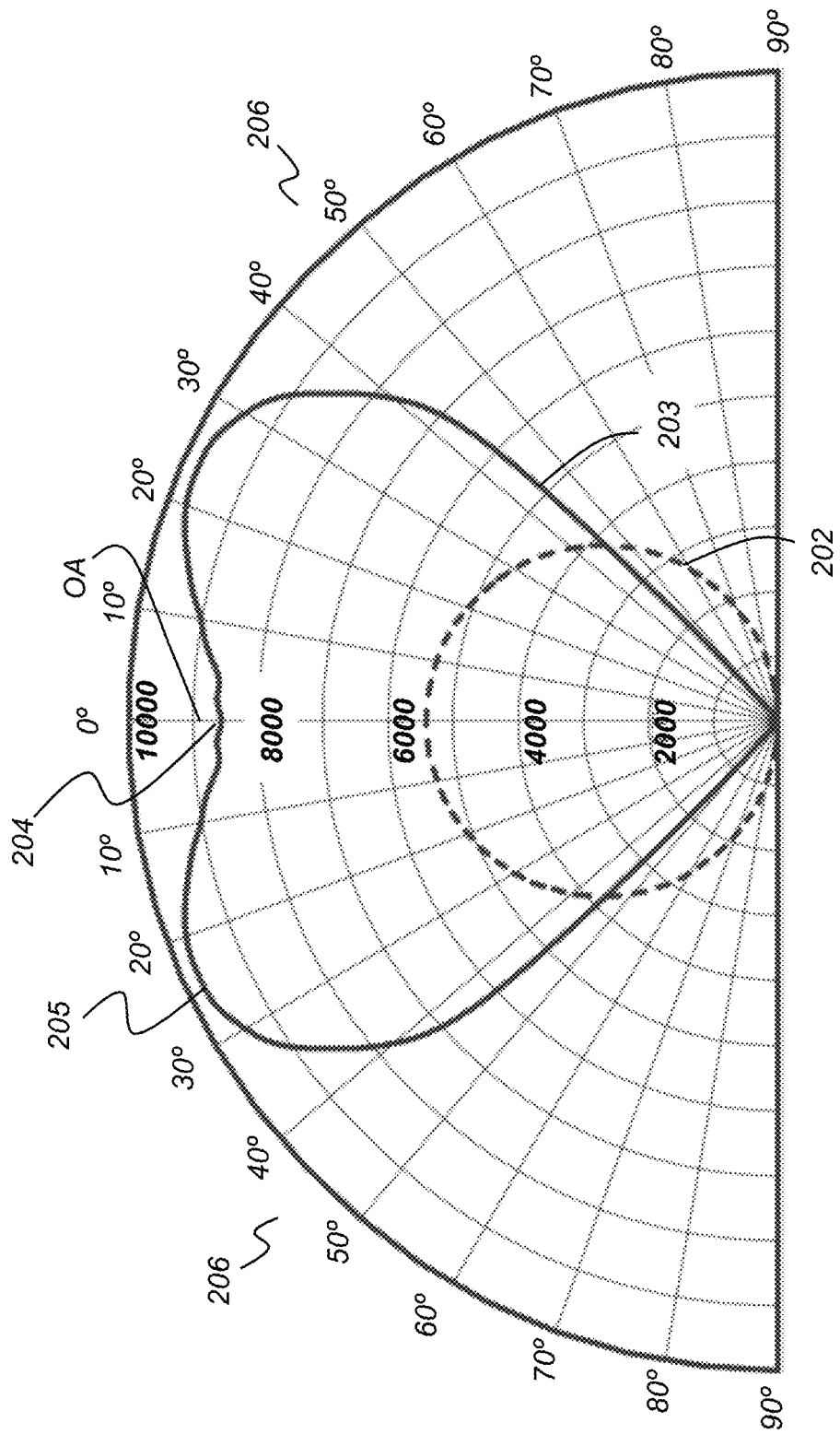
FIG. 14 is a polar plot of optical intensity distribution for a LED before and after redirection by a lens according to an embodiment of the present disclosure.

In another alternate embodiment of the present disclosure, the optical distribution has a particular shape where the center intensity at the optical axis is less than the peak candela value that is at least 15 degrees or more away from the center. FIG. 14 is an optical distribution mapping that shows a possible embodiment of the optical intensity distribution from lens L2 and LED of the array of FIG. 12.

In the FIG. 14 distribution mapping, a Lambertian distribution 202 shows the native emission distribution of the LED itself. An improved optical distribution 203 shows the improvement obtained using lens L2, such as that shown in FIG. 6. Optical distribution 203 has peaks 205 at least 15 degrees away from the center optical axis OA and a center optical intensity as shown at 204. In addition, optical distribution 203 has cutoff angles 206 beyond which the optical intensity is less than 10%, 5%, or 2% of the center optical intensity 204. Typical values for cutoff angle 206 can be beyond 40, 45, 50 or 55 degrees from the optical axis.

The baffle B feature is preferably fabricated in the same manufacturing operation as lens surface S1 and S2. Such manufacturing operation may include for example plastic injection molding or casting.

Embodiments of the present disclosure provide an inexpensive and capable solution for boosting efficiency of light conveyance, particularly for large-scale illumination applications. According to another aspect of the present disclosure, photonic component 70 can be a sensor or other type of light detector. In detector embodiments, the path of light is reversed from that described hereinabove for illumination apparatus. That is, with respect to FIG. 6 for example, light from a light source is incident on surface S2 and exits lens L2 from surface S1.

The Applicant has found that following the surface shape and spacing geometry described herein helps to improve the distribution of light traveling through the optics in either direction for planar photonic components. The Applicant's design can be particularly effective for light management where the light source has a Lambertian output profile. The design described herein provides straightforward adjustment of light angles, with slight redirection that increases as the range of light emission angles diverges from normal direction and presenting a changing incident surface shape for more aggressive redirection of light at increasingly higher oblique angles. By avoiding sharp discontinuities in the lens surface, the optics can be successfully fabricated and assembled with planar light sources so that a relatively uniform light intensity can be provided for illumination applications, even where a considerable amount of light is emitted at oblique angles. The Applicant's arrangement allows close spacing of lens components, helping to maximize the use of space for lighting efficiency.

The invention has been described with reference to a preferred embodiment. However, it can be appreciated that variations and modifications can be effected by a person of ordinary skill in the art without departing from the scope of the invention.

The invention claimed is:

1. A light generating apparatus comprising:
   a) at least one light-emitting diode energizable to generate light having a first optical distribution along an optical axis; and
   b) at least a first lens, formed of a lens material, in the path of the generated light and disposed to emit, from an exit surface, the generated light with a second optical distribution, wherein the second optical distribution includes glare light at emissive angles exceeding 50 degrees from the optical axis,
   wherein the first lens is a monolithic structure that further includes a periphery having at least a first baffle surface formed from the lens material as part of the monolithic structure, wherein the at least the first baffle surface is continuous with the lens surface, wherein the at least the first baffle surface is featured to redirect at least a portion of incident glare light emitted from the exit surface of the at least the first lens.

2. The apparatus of claim 1 wherein the at least the first baffle surface redirects the glare light by reflection.

3. The apparatus of claim 2 wherein the at least the first baffle surface has a coating.

4. The apparatus of claim 2 wherein the at least the first baffle surface has a metallic coating.

5. The apparatus of claim 1 wherein the at least the first baffle surface redirects glare light by refraction.

6. The apparatus of claim 1 wherein the at least the first baffle surface redirects glare light by reflection and refraction.

7. The apparatus of claim 1 wherein the at least the first baffle surface redirects glare light by diffusion.

8. The apparatus of claim 1 wherein the periphery further has at least a second baffle surface that is featured to redistribute at least a portion of light redirected by the first baffle surface.

9. A light generating apparatus comprising:
   a) at least one planar light-emitting diode surface energizable to generate light with a first optical distribution about a normal to the diode surface; and b) a monolithic lens structure that includes both a lens and a baffle, the monolithic lens structure formed from a lens material and having:

(i) a lens incident surface in the path of the generated light and spaced apart from the light-emitting diode surface, wherein the lens is disposed to redistribute at least a portion of the generated light that is incident on the incident surface of the lens;

(ii) a curved output surface of the lens configured to impart a second optical distribution to light that has been emitted from the output surface of the lens, wherein the second optical distribution includes glare light at emissive angles exceeding 50 degrees from the direction normal to the light-emitting diode surface; and (iii) a baffle surface, wherein the baffle surface is continuous with the lens output surface and is formed from the lens material, wherein the baffle surface is featured to redistribute at least a portion of the glare light that is emitted from the curved output surface and incident on the baffle surface.

10. The apparatus of claim 9 wherein the baffle surface redirects glare light by reflection.

11. The apparatus of claim 10 wherein the baffle surface has a multilayer coating.

12. The apparatus of claim 10 wherein the baffle surface has a metallic coating.

13. The apparatus of claim 9 wherein the baffle surface redirects glare light by refraction.

14. The apparatus of claim 9 wherein the baffle surface redirects glare light by reflection and refraction.

15. The apparatus of claim 9 wherein the baffle surface redirects glare light by diffusion.

16. The apparatus of claim 9 wherein the baffle surface is a first baffle surface and wherein the lens further has a second baffle surface that is featured to redistribute at least a portion of light redirected by the first baffle surface.

* * * * *